United States Patent Office 2,802,818
Patented Aug. 13, 1957

2,802,818
PHTHALIDES

Donald D. Wheeler and David C. Young, Midland, Mich., assignors to The Dow Chemical Company, Midland, Mich., a corporation of Delaware No Drawing. Application July 5, 1956,
Serial No. 595,853

2 Claims. (Cl. 260—152)

This invention is concerned with phthalides and is particularly directed to phenylazoanilinophthalides having the structure

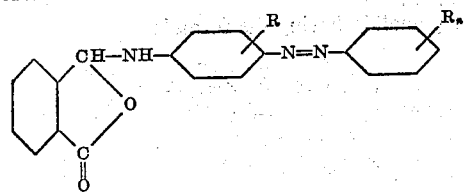

In this and succeeding formulae, each R represents hydrogen, methyl, ethyl, chloro or nitro, and $n$ is an integer of from 1 to 2, inclusive. These compounds are crystalline solids somewhat soluble in organic solvents such as acetone, benzene and ethanol and substantially insoluble in water and petroleum ether. These compounds are useful as parasiticides and are adapted to be employed for the control of bacteria, fungi, nematodes and insects. Further, these phthalides are valuable intermediates in the synthesis of nitrogenous organic compounds.

The new compounds may be prepared by causing phthalaldehydic acid to react with a phenylazoaniline having the formula

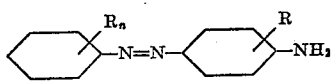

to produce the desired phthalide and water of reaction. The terms "phthalaldehydic acid" and "3-hydroxyphthalide" refer to a compound having the structure

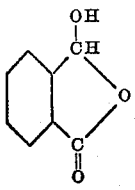

Phthalaldehydic acid is often represented in the literature as having the structure

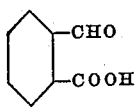

However, the acid employed in this invention and prepared as hereinafter described exists almost entirely in the 3-hydroxyphthalide ring structure, as indicated by its infrared absorption spectrum. Infrared data also indicate the phthalide products to have the same characteristic ring structure.

The reaction conveniently may be carried out in an inert solvent as reaction medium and takes place readily in the temperature range of form 20° to 150° C. with the formation of the desired phthalide products and water of reaction. Suitable solvents include acetone, benzene, butanone, water and alcohol. Good results are obtained when substantially equimolar proportions of the reactants are employed.

In carrying out the reaction, phthalaldehydic acid and the appropriate phenylazoaniline are dissolved in or mixed with the reaction solvent. Mixing of the reactants oftentimes results in the development of heat of reaction. The reaction mixture is then heated for a period of from a few minutes to several hours to obtain the desired phthalide product. The latter usually precipitates from the reaction mixture during the heating as a crystalline solid. The mixture is then cooled to precipitate further product and the latter recovered from the mixture by filtration. The phthalide product may be purified, if desired, by washing with or recrystallizing from a suitable solvent.

The following examples illustrate the invention but are not to be construed as limiting.

*Example 1.—3-(4-phenylazoanilino)phthalide*

39.4 grams (0.2 mole) of p-phenylazoaniline and 150 milliliters of acetone were mixed together and heated to about 50° C. 30.0 grams (0.2 mole) of phthalaldehydic acid were added thereto whereupon a precipitate formed and turned the mixture into a semi-solid mass. The mixture was then allowed to cool and the solid separated therefrom by filtration. The separated solid was washed with acetone and dried to obtain a 3-(4-phenylazoalinino)-phthalide product melting at 242°–244° C. The yield of the product was 63 grams or 96 percent of theoretical.

*Example 2.—3-(4-(o-tolylazo)-m-toluidino)phthalide*

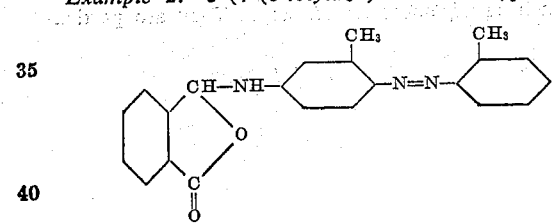

42.2 grams (0.2 mole) of 4-(o-tolylazo)-m-toluidine and 160 milliliters of acetone are mixed together. 30.0 grams (0.2 mole) of phthalaldehydic acid is added thereto and the resulting mixture heated on the steam bath for 30 minutes. The mixture is then cooled in an ice bath to precipitate the product as a solid. The latter is removed from the mixture by filtration to obtain a 3-(4-(o-tolylazo)-m-toluidino)phthalide produce having a molecular weight of 357.

*Example 3.—3-(4-(3,4-dichlorophenylazo)anilino)phthalide*

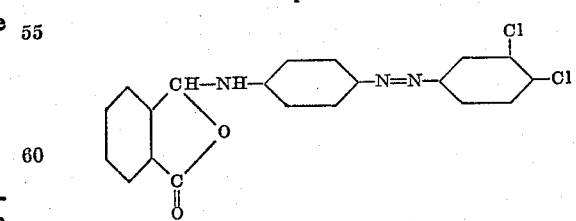

53.2 grams (0.2 mole) of 4-(3,4-dichlorophenylazo)aniline, 30.0 grams (0.2 mole) of phthalaldehydic acid and 150 milliliters of butanone are mixed together and heated on the steam bath for one hour. The mixture is then cooled in an ice bath to precipitate a product as a solid. The latter is removed from the mixture by filtration to obtain a 3-(4-(3,4-dichlorophenylazo)anilino) phthalide product having a molecular weight of 398.

*Example 4.—3(4-(o-nitrophenylazo)-o-toluidino) phthalide*

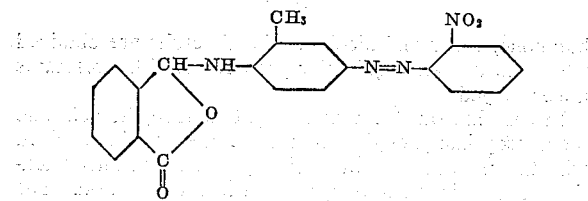

51.2 grams (0.2 mole) of 4-(o-nitrophenylazo)-o-toluidine and 180 milliliters of butanone are mixed together and warmed on the steam bath. 30.0 grams (0.2 mole) of phthalaldehydic acid is added thereto and the resulting mixture heated on the steam bath for 45 minutes. The mixture is then cooled in an ice bath to precipitate a product as a solid. The latter is removed from the mixture by filtration to obtain a 3-(4-(o-nitrophenylazo)-o-toluidino)phthalide product having a molecular weight of 388.

In similar preparations, the following phenylazoanilinophthalides are prepared:

3-(4-(2-ethylphenylazo)-o-toluidino)phthalide having a molecular weight of 371 by the reaction of phthalaldehydic acid and 4-(2-ethylphenylazo)-o-toluidine.

3-(4-(4-nitrophenylazo)anilino)phthalide having a molecular weight of 242 by the reaction of phthalaldehydic acid and 4(4-nitrophenylazo)aniline.

3-(4-(3,4-xylylazo)anilino)phthalide having a molecular weight of 225 by the reaction of phthalaldehydic acid and 4-(3,4-xylylazo)aniline.

The phthalides are useful as parasiticides. They are effective as toxicants in insecticide compositions and may be employed against organisms such as the American cockroach (*Periplaneta americana*). They are particularly useful in antimicrobial and germicidal compositions. In a representative operation, complete inhibition of growth was obtained when a nutrient agar medium saturated with 3-(4-phenylazoanilino)phthalide was streaked with *Staphylococcus aureus* and incubated at 30° C. for three days.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant boiling hydrochloric acid and ferric chloride solution, as more fully disclosed in U. S. Patent 2,748,162.

The phenylazoaniline employed in this invention may be prepared by diazotizing an appropriately substituted primary aromatic amine with nitrous acid to form a diazonium salt. The latter may then be coupled with a substituted aniline in the presence of a base such as sodium acetate to obtain the desired phenylazoaniline.

We claim:
1. A phthalide having the formula

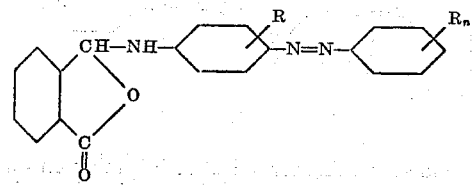

wherein each R represents a member of the group consisting of hydrogen, methyl, ethyl, chloro and nitro, and $n$ is an integer of from 1 to 2, inclusive.

2. 3-(4-phenylazoanilino)phthalide.

No references cited.